United States Patent [19]

Rutherford

[11] 4,433,575

[45] Feb. 28, 1984

[54] FLOW SPLITTING DEVICE FOR FLUID FLOW METER

[76] Inventor: Ralph E. Rutherford, 16428 Englewood, Los Gatos, Calif. 95030

[21] Appl. No.: 265,339

[22] Filed: May 19, 1981

[51] Int. Cl.³ ............................ G01F 1/46; G01F 5/00
[52] U.S. Cl. ....................................................... 73/202
[58] Field of Search ................ 73/202, 861.65, 861.66, 73/861.67

[56] References Cited

U.S. PATENT DOCUMENTS

| | | | |
|---|---|---|---|
| 790,888 | 5/1905 | Ferris | 73/202 |
| 1,116,938 | 11/1914 | Sheldon | 73/861.66 |
| 3,581,565 | 6/1971 | Dieterich | 73/861.66 |
| 3,805,610 | 4/1974 | Jacobs | 138/43 |

*Primary Examiner*—Herbert Goldstein
*Attorney, Agent, or Firm*—Claude A. S. Hamrick

[57] ABSTRACT

A flow splitting device (10) for use in fluid flow meters and the like including an outer housing (12) forming a cavity having an inlet (28) and an outlet (30), a porous baffle (32) dividing the cavity into an inlet chamber (35) and an outlet chamber (37), an apertured plug (42) having one end engaging the surface of the baffle facing the outlet chamber and a tube (62) extending through the housing and into communication with the plug, and an opposite end (60) extending through the housing and into communication with the outlet chamber. The external portion of the tube (62) being suitable for coupling with a sensing device for measuring the split flow therethrough.

10 Claims, 5 Drawing Figures

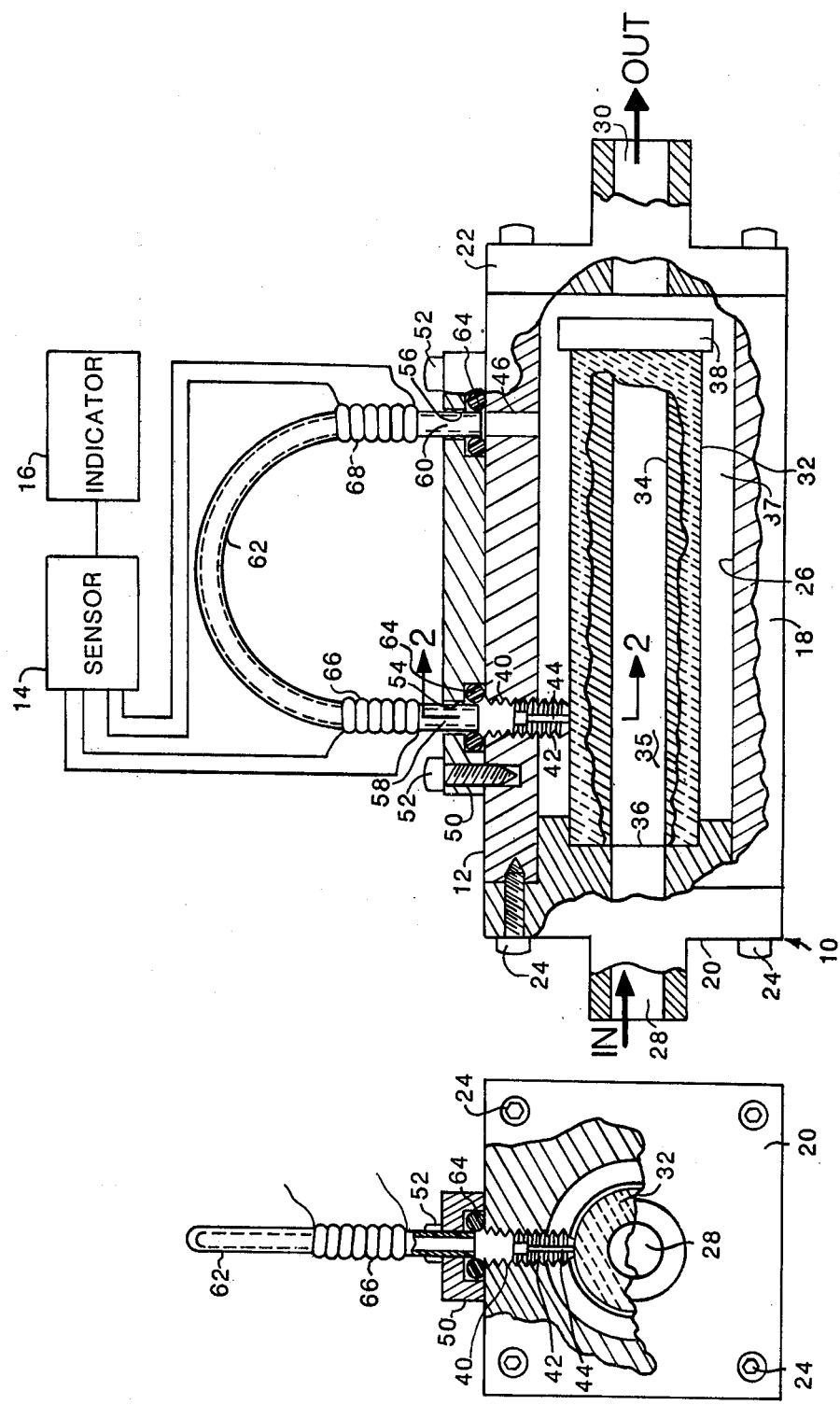

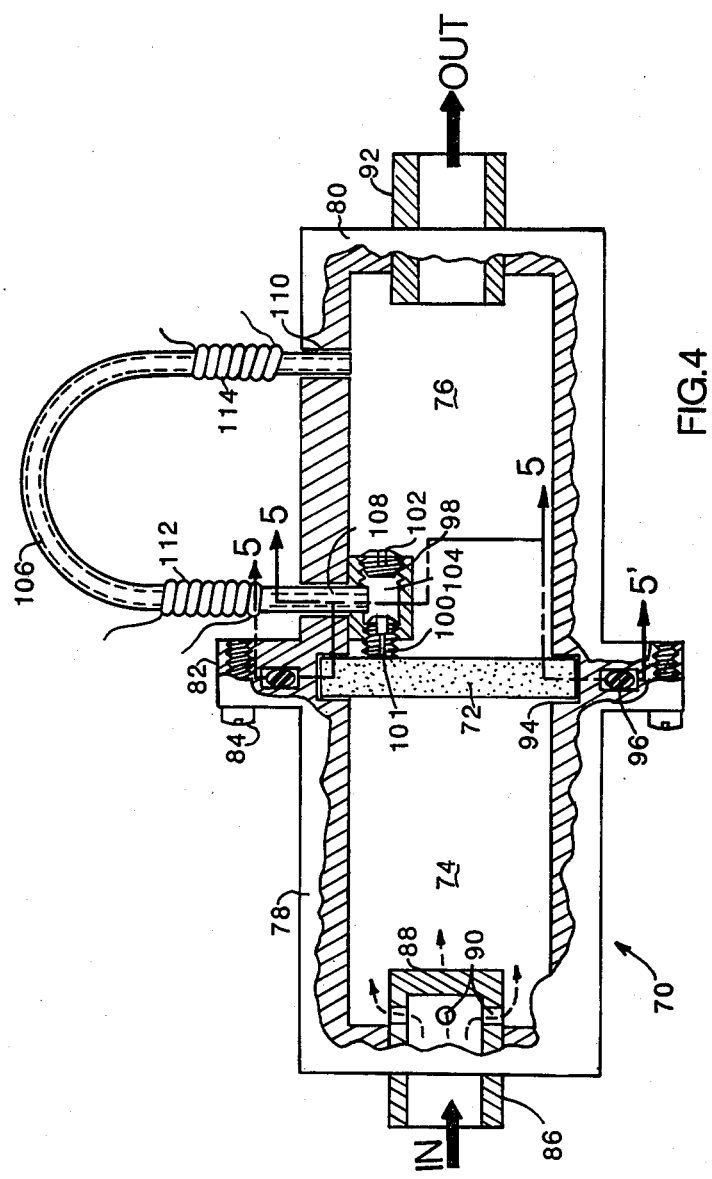
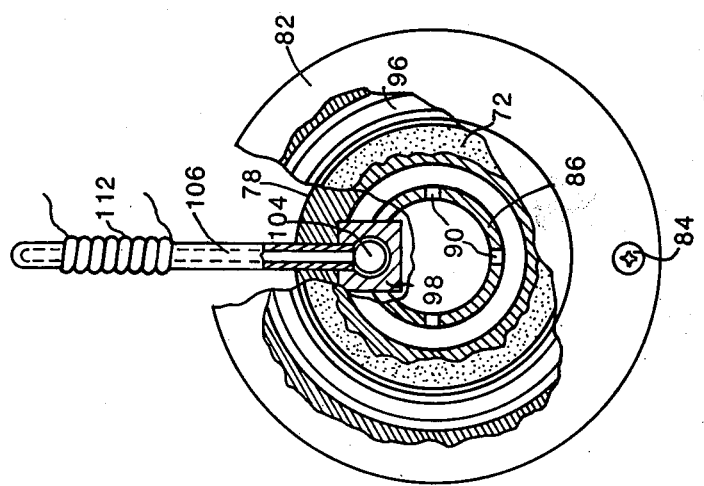

FLOW SPLITTING DEVICE FOR FLUID FLOW METER

BACKGROUND OF THE INVENTION

1. Field of the Invention

The present invention relates generally to fluid flow sensing apparatus and more particularly to a flow splitting device which accurately separates a splitstream that is linearly related to the total flow stream being monitored and is substantially independent of flow stream variables.

2. Description of the Prior Art

In the processing of electronic components, as well as in many other processing fields utilizing a stream of flowing fluid in either gaseous or liquid form, it is necessary that one be able to accurately measure the quantity of fluid flowing through a supply conduit and into a particular utilization chamber or the like. It is also important to know that the indication remains accurate with changes in fluid pressure, temperatures, viscosity or molecular weight.

Although numerous types of fluid flow meters are described in the prior art, among which are included those devices disclosed in the U.S. patents to E. T. Booth, Jr., U.S. Pat. No. 2,594,618, Frank D. Werner, et al., U.S. Pat. No. 3,433,068 and Richard F. Blair, U.S. Pat. No. 3,938,384, the accuracy of such devices with respect to changes in fluids and the variable parameters thereof is dependent upon the use of electronic or other compensating means in order to provide appropriate compensation for the nonlinearity of the flow division.

The principal problem associated with prior art devices is that the flow dividing systems typically do not provide a linear relationship between the main body of the flow and the portion of the flow which is directed through a sensing element. As a consequence, where the split flow is not linearly related to the main flow, the sensed output will necessarily be nonlinear and the nonlinearity must be compensated for.

SUMMARY OF THE PRESENT INVENTION

It is therefore a primary objective of the present invention to provide a flow splitting device for use in a flow meter, with such splitting device having the characteristic that the split flow is directly proportional to the main flow.

Another objective of the present invention is to provide a device of the type described which is simple in construction and may be used to monitor the flow rates of a variety of gases without difficult recalibration.

Another objective of the present invention is to provide a device of the type described wherein the gas passing therethrough experiences a minimum of pressure drop.

Briefly, a preferred embodiment of the present invention includes a housing forming a chamber having an inlet and an outlet through which the fluid to the monitor may be passed, a porous baffle-like medium disposed within the chamber so as to divide it into two subchambers with all of the fluid flowing through the device flowing through the porous medium both chambers, and means forming a split path for separating the fluid going through a particular area of the porous medium and directing it through a thermal or other suitable sensing means and then returning it to the downstream such chamber. The surface area of the porous medium though which the flow stream is being split off is small relative to the total surface area thereof.

A principal advantage of the present invention is that since the flow is divided in a fixed ratio over a wide range of flow rates, a linear response over the range may be obtained.

Another advantage of the present invention is that since the division ratio is independent of inlet and outlet pressures, the device has a pressure coefficient which is effectively zero.

Still another advantage of the present invention is that since the division ratio is independent of stream temperature, the device has a temperature coefficient which is effectively zero, assuming of course that the sensing element associated with the split path also has a zero temperature coefficient.

Yet another advantage of the present invention is that the division ratio is independent of molecular weight, or density and viscosity of the fluid passed therethrough. This allows the use of an instrument calibrated for one flow material to be used for another flow material by applying a simple correction factor to the sensor output. Since the sensor output is typically a function of flow rate and specific heat, a correction factor derived from the specific heats of the materials is all that is required to provide a new calibration.

These and other advantages of the present invention will no doubt become apparent to those skilled in the art after having read the following detailed description of the preferred embodiments which are illustrated in the several figures of the drawing.

IN THE DRAWING

FIG. 1 is a partially broken side elevation showing a flow splitting device used in a flow meter in accordance with the present invention;

FIG. 2 is a partially broken end view of the flow splitting device illustrated in FIG. 1;

FIG. 4 is a partially broken side elevation showing an alternative embodiment of a flow splitting device in accordance with the present invention; and FIG. 5 is a partially broken end view of the device illustrated in FIG. 4.

DESCRIPTION OF THE PREFERRED EMBODIMENTS

Figure 3:
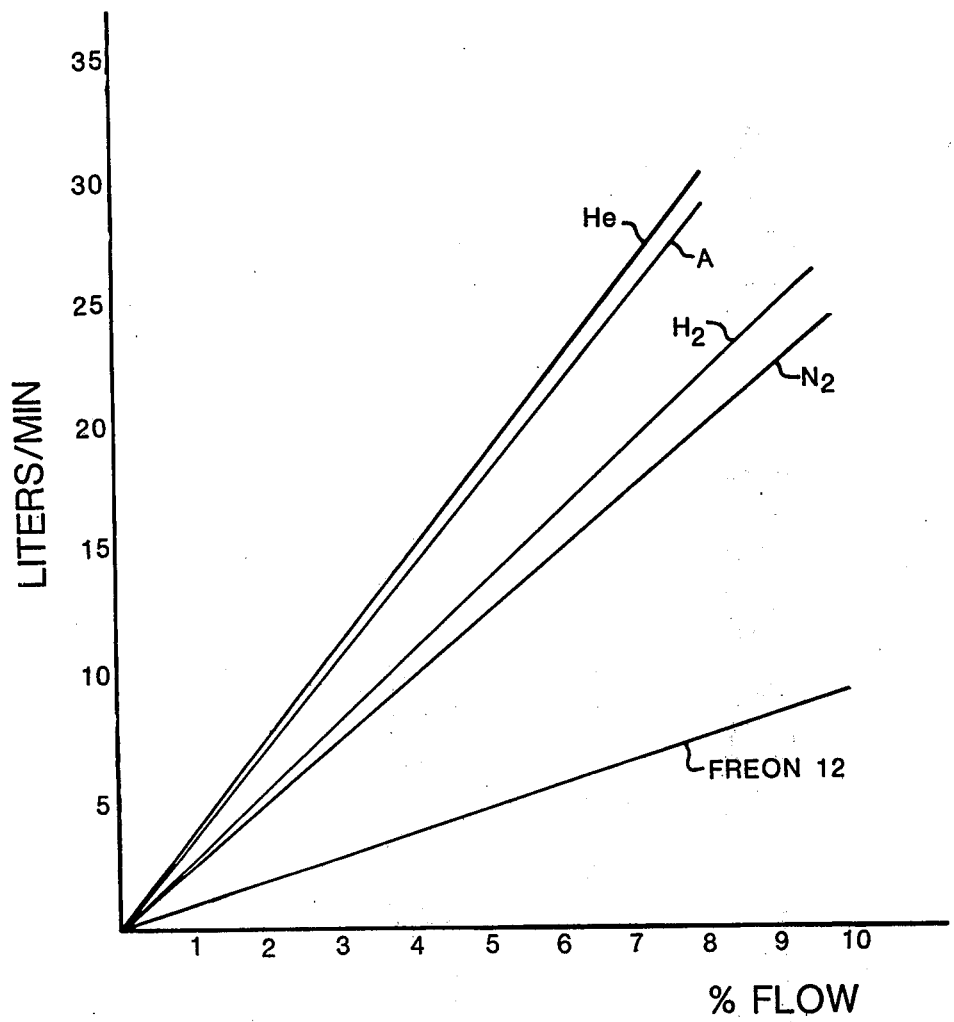
FIG. 3 is a chart illustrating the operative characteristics of the present invention.

Referring now to FIGS. 1 and 2 of the drawing, a fluid flow meter in accordance with the present invention is shown generally at 10 and includes a splitting device at 12 for separating a portion of the flow stream into a split stream, or sensing stream, a sensor device 14 for sensing the volume of flow in the sensing stream, and an indicator 16 for providing a suitable indication of the measured flow. Apart from the improved flow meter combination, the sensor 14 and indicator 18 may be comprised of any suitable devices capable of accurately measuring the volume of flow in a flow stream and providing an output indication corresponding thereto.

The splitting device 12 is comprised of an outer body formed of a bored rectangular block 18 and two end plugs 20 and 22 which are fastened thereto by suitable bolts 24. When combined in the manner illustrated, the block 18 and plugs 20 and 22 form an internal cavity 26 having an inlet orifice 28 and an outlet orifice 30. Disposed within cavity 26 is a tubular baffle 32 which is preferrably made of a sintered metal and which has an axial bore 34 that communicates at one end 36 with the inlet orifice 28, and is capped at the other end by a cap 38.

The primary purpose of the baffle 32 is to provide a porous barrier through which an input flow stream divides uniformly so as to have the same flow through like portions thereof. In the preferred embodiment, baffle 32 is made of sintered 316 stainless steel alloy, but alternatively, could be made from sintered bronze, porous ceramic materials or perhaps porous materials. In the preferred embodiment used to monitor semiconductor processing fluids, it is believed that the passages through baffle 32 are on the order of approximately 200 microns in diameter. For the other fluids, other sintered material or sintering formulations may be used to approximately increase or decrease the passage dimensions.

Disposed within a threaded opening 40 in block 18 is a sampling plug 42 having an axial bore 44. Plug 42 is threaded far enough through opening 40 and into cavity 26 so as to sealingly engage the outer surface of tube 32. The inside diameter of bore 44 is typically on the order of 0.010 to 0.250 inch and serves to separate that portion of the fluid flowing through tube 32 which corresponds to the cross-sectional area of bore 44. It will thus be appreciated that the volume of flow through bore 44 will have a ratio determined by the cross-sectional area thereof and the uncovered external surface area of tube 32. Also provided in the top of block 18 is a second bore 46 which is unthreaded and which provides a return flow path for gases passing out of chamber 26 through plug 42.

Affixed to the top of block 18 is a mounting plate 50 which is secured thereto by bolts 52. Plate 50 is bored at 54 and 56 to receive the respective ends 58 and 60 of a sensing tube 62 which provides a path for the separated stream to flow from plug 42, be measured, and then be returned to cavity 26 via passageway 46. Note that O-ring seals 64 are provided at each end of tube 62 for preventing leakage of fluid from the device.

In the preferred embodiment, the sensor 14 is a bridge device of the type disclosed in the above-mentioned Blair patent and includes as sensor elements a pair of temperature sensitive resistive wire coils 66 and 68 which are wound around the outer surface of tube 62. As described in the Blair patent, the coils 66 and 68 are heated and included within a bridge detecting circuit such that the rate of mass flow of the fluid passing through tube 62 is directly proportional to the temperature differential between the sensor elements.

In operation, the fluid flow stream enters the device through inlet 28 and passes into an input chamber 35 defined by the interior walls of baffle 32 and thence passes radially through the porous material and into an outer chamber 37 defined by the outer surface of baffle 32 and the inner surface 26. In passing through the porous barrier, the flow experiences a small pressure drop and is divided as the ratio of the area of the bore of plug 42 to the total outside surface area of barrier 32. The cap 38 merely seals the end of the baffle so that the entire stream must pass through the porous walls thereof.

It will thus be appreciated that the portion of the stream which passes through plug 42 will represent a fixed portion of the total fluid stream, and thus the mass of fluid flowing through tube 62 and monitored by sensor 14 will be directly proportional to and representative of the total flow stream passing through device 10. The illustrated device can be used to meter flows over various ranges by simply adjusting the ratio of the total surface area of the porous material of baffle 32 to the bore area of plug 42.

Thermal flow sensors typically used have maximum capacities of a few standard cubic centimeters per minute and typical linear ranges are between 0–5 and 0–50 standard cubic centimeters per minute. With the illustrated arrangement, signals can be representative of total flows through the device ranging up to hundreds of liters per minute. This is, of course, many thousands of times the range of the basic sensor.

The porosity of the material used for barrier 32 is of little consequence so long as it is relatively uniform. The principal controlling factor is that the maximum pore size must be such that the plug passage 44 sees a representative sample of the total flow through barrier 32.

Whereas, prior art flow dividing systems did not provide a linear relationship between the main body of the flow stream and the portion of the flow stream directed through a sensing element, the use of a uniform porous material in accordance with the present invention does provide a predictable flow stream division and thereby eliminates the previous need to change the division ratio of the metering device to accommodate changes in pressure, temperature, viscosity or molecular weight. Since the sensing device 14 produces a signal that is proportional to the mass flow rate times the specific heat of the metered material times a fixed sensor constant, the illustrated device can be used on flow streams other than that for which it was originally calibrated by simply applying a correction factor derived only from a knowledge of the specific heats of the materials being metered. By way of example, if the device were to be calibrated on nitrogen which has a molecular weight of 28.01 and a specific heat (Cp) of 6.96 Cal/Mol/°C. If the new flow stream is to be Dichlorodifluro Methane $CCl_2F_2$ (Freon 12) which has a molecular weight of 120.91 and a specific heat of 17.307 Cal/Mol/°C., then, assuming the nitrogen flow at 100% reading (full scale) is 10 standard liters/minute the freon 12 flow would be:

nitrogen flow×(Cp nitrogen/Cp freon 12)=freon flow

Therefore:

freon flow = 10 liters × (6.96/17.307)

= 4.02 liters of freon

As illustrated in FIG. 3 of the drawing, the same process can be used to calculate a set of calibration curves for other materials. It is therefore a substantial advantage of the present invention that the output of the described system bears a linear relationship to flow. This is true even if the flow stream is a gas with a molecular weight much less than or much greater than that used for the initial calibration.

Turning now to FIGS. 4 and 5, an alternative embodiment of the present invention is illustrated at 70 which uses a porous disc 72 as the baffle element rather than the cylindrical barrier element 32 used in the previous embodiment. In order to readily accommodate manufacture of the device, as well as facilitate interchange of components, if desired, the portions of the device forming the inner and outer chambers 74 and 76, respectively, are modified to include a pair of cup-shaped members 78 and 80 which are flanged to mate as illustrated at 82 and are held together by means of apropriate bolts or screws 84.

An inlet for the device is formed by means of another smaller cup-shaped member 86 which is closed at its downstream end, as shown at 88, but includes radially extending openings 90 which serve to diffuse the gas flow so that the pressure applied to the input face of disc 72 is substantially uniform over the surface area thereof. An outlet for the device is formed by a cylindrical member 92 which is fixed to member 80 as illustrated.

Note that disc 72 is received within an annular groove 94 formed by facing annular recesses in the mating walls of members 78 and 80. Note also that an O-ring seal is provided at 96.

Disposed within member 80 is a small housing 98 which is bored and tapped fore and aft respectively to receive the aperture plug 100 and a rear plug 102, as illustrated. Housing 98 also forms a manifolding chamber 104 into which the input end of a sensing tube 106 extends.

As in the previous embodiment, appropriate bores are provided within the member 80 at 108 and 110 for receiving the respective ends of tube 106. Since in this case, tube 106 need not be removed in order to position plug 100 against the downstream face of porous disc 72, the tube can be permanently affixed to member 80 or alternatively, appropriate mounting and sealing means (not shown) could be provided. As in the previous embodiment, sensing coils 112 and 114 are wrapped about tube 106 and lead to appropriate sensing electronics.

The operation of this embodiment is substantially identical to that previously described in that the volume of flow passing through the bore 101 of plug 100 will be proportional to the total volume of flow passing through the exposed surfaces of porous disk 72. Thus the device will have substantially the same characteristics of that previously described.

Although the present invention has been described above with respect to two preferred embodiments, it is contemplated that many alterations and modifications thereof will become apparent to those skilled in the art after having read the above disclosure. It is therefore intended that the appended claims be interpreted as covering all such alterations and modifications as fall within the true spirit and scope of the invention.

What is claimed is:

1. In a flow meter of the type having splitter means for splitting off a sample of a fluid flow stream to be monitored, sensing means for sensing the flow of fluid in the split stream, and means for indicating the output of the sensing means, an improved splitter means comprising:
    housing means forming an internal cavity having an inlet and an outlet;
    porous baffle means disposed within said cavity so as to divide said cavity into a first chamber communicating with said inlet and a second chamber communicating with said outlet;
    plug means disposed at least partially within said second chamber and engaging a wall of said baffle means, said plug means having an opening therein forming a passageway for fluid passing through a predetermined area of said porous baffle means defined by said opening;
    sensing tube means having one end communicating with said plug means to receive fluids passing through said passageway, and an opposite end communicating with said second chamber, whereby fluids flowing into said inlet pass into said first chamber, through said baffle means into said second chamber, and thence out through said outlet with a predetermined portion of the fluid flowing through said baffle means passing through said tube means prior to passing into said second chamber.

2. In a flow meter of the type recited in claim 1 wherein said porous baffle means is in the form of an elongated tube of porous material having one end thereof blocked and the other end thereof open and in communication with said inlet, the internal diameter of said tube means defining walks of said first chamber.

3. In a flow meter of the type recited in claim 1 wherein said porous baffle is in the form of a flat plate extending between opposite walls of said housing to divide said cavity into said first and second chambers.

4. In a flow meter of the type recited in claim 3 wherein said cavity is generally cylindrical in configuration and wherein said porous baffle is disc-shaped and is disposed transverse to the longitudinal axis of said cavity.

5. In a flow meter of the type recited in claim 4 wherein said inlet and said outlet are disposed along the longitudinal axis of said cylindrical cavity and wherein diffuser means are provided at said inlet for diffusing fluids entering said inlet so that the face of said porous baffle facing said first chamber is subjected to a substantially uniform fluid flow pressure.

6. A fluid splitting device for use in a fluid flow meter, comprising:
    housing means forming a cavity having inlet means and outlet means;
    porous baffle means disposed within said cavity so as to divide said cavity into an inlet chamber communicating with said inlet means and an outlet chamber communicating with said outlet means; and
    splitter means forming a sensing passageway extending from the wall of said porous baffle means facing said outlet chamber through said outlet chamber and said housing means, and thence back through said housing means into said outlet chamber, whereby the volume of fluid flowing through said sensing passageway is directly proportional to the total volume of fluid flowing through said device, and whereby sensor means may be coupled to the portion of said sensing passageway extending external of said housing to measure the rate of fluid flow therethrough as a measure of the total volume of fluid flowing through said device.

7. A fluid splitting device as recited in claim 6 wherein said porous baffle means is a tubular member blocked at one end and open to said inlet means at the other end, the inside wall thereof defining said inlet chamber.

8. In a fluid splitting device as recited in claim 7 wherein said porous baffle means is planar in configuration and has a surface on one side facing said inlet chamber and a surface on the opposite side facing said outlet chamber.

9. In a fluid splitting device as recited in claim 8 wherein said porous baffle means is disc-shaped and is disposed across a portion of said housing which is annular in configuration.

10. In a fluid splitting device as recited in claim 7 wherein the input end of said sensing passageway is formed by an apertured plug one end of which engages a surface of said porous baffle means and the plug aperture forms an inlet for fluids passing through said baffle means and out of an area of the surface thereof defined by the dimensions of said aperture.

* * * * *